July 26, 1966 W. F. M. DE WAAL 3,262,551
FRAME FOR A CONVEYOR BELT
Filed July 30, 1964
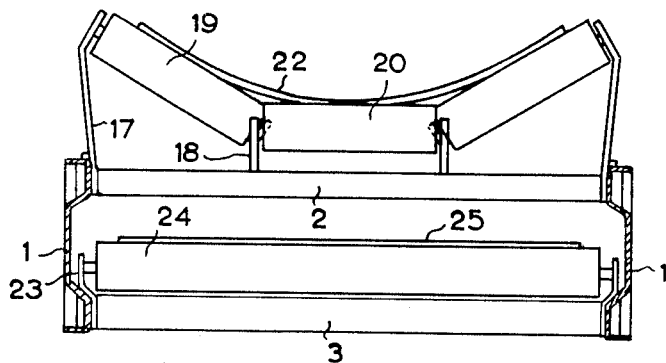
FIG. 1
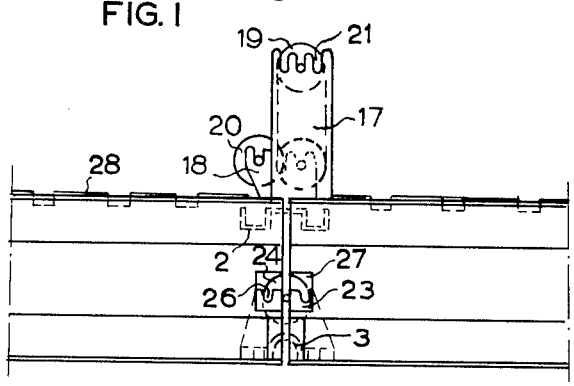
FIG. 2
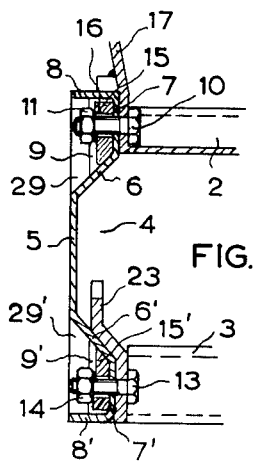
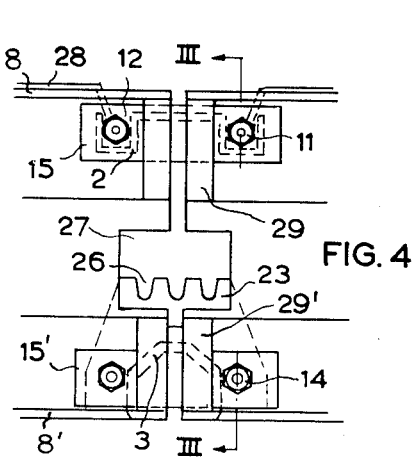
Inventor
Willy F. M. De Waal
By Cushman, Darby & Cushman
Attorneys

United States Patent Office 3,262,551
Patented July 26, 1966

3,262,551
FRAME FOR A CONVEYOR BELT
Willy F. M. de Waal, Heerlen, Netherlands, assignor to Stamicarbon N.V., Heerlen, Netherlands
Filed July 30, 1964, Ser. No. 386,130
Claims priority, application Netherlands, Aug. 5, 1963, 296,280
6 Claims. (Cl. 198—204)

The present invention relates to a frame for a conveyor belt, consisting of two stringers (i.e., longitudinal members) built up of sections, e.g., longitudinal stringers formed from a number of longitudinal sections, which stringers are connected by traverses (i.e., cross members) carrying the idler brackets for the upper and lower strands of the conveyor belt.

In the underground workings of a colliery, special demands are made on belt conveyors. In the first place, the conveyor belt should have the largest possible width at minimum over-all width of the conveyor, so that the passage alongside the conveyor in the gallery can be kept as wide as possible. As the conveyor not only serves to remove the product recovered, but is also used for the transport of machines and supporting materials, the frame has to be strong. On the other hand, in view of the need for transport of this frame through the shaft and the galleries, it is desirable for the frame to be light. In addition, assembling and disassembling of this frame should be possible with a minimum number of fastening elements and by a minimum number of men.

As the floor on which the conveyor stands is not even, but has irregularities, e.g. troughs and saddles, and since the belt mostly consists of several sections fastened to one another by means of clamps and hence is never perfectly straight, it may happen that the belt will slide sideways with respect to the idlers so that the belt will drag against the frame. Owing to the fact that the supervision of the belt, which often is hundreds of yards long, is limited, it will in many cases be impossible to take timely corrective action, so that serious damage to the belt may result, particularly if the belt drags against one of the frame columns, since in this case the pressure per unit area in the place of contact is very high.

The present invention provides a belt conveyor and a frame for this conveyor which both satisfy the demands made in the underground workings of a mine.

This is obtained in that according to the invention the stringers are trough-shaped in cross section, the flat bottom being on a level with the lower strand of the conveyor belt, and the side walls, which project inwards, being so bent that over and under the trough there are trough-shaped parts which are open towards the outside of the frame and in which the fastening elements for the traverses are accommodated.

This type of section combines high rigidity with low weight. This section can be pressed from sheet metal in a simple way, a plate thickness of 2–3 mm. being sufficient to ensure the desired degree of stiffness. Owing to this, the construction is both lighter and cheaper than a frame made of section beams.

The width of the frame is now determined by the distance between the flat bottoms of the trough-shaped centre parts of two stringers on either side of the belt. This distance need be only little greater than the belt width, so that the over-all width of the conveyor is small.

By preference the stringers are given a symmetrical cross-section. In this case there is no need in transporting the parts of the conveyor in the mine galleries to take account of the position of the stringers, to the left or to the right, with respect to the frame.

If the lower strand should so shift on the idlers that the side edge of the belt drags against the frame, this edge will be in contact with the flat bottom of the trough-shaped centre part over a large distance. The pressure per unit area is lower in this case than if the belt locally rubs along a frame column, so that the danger of the belt getting damaged is small. Since, according to the invention, openings are made in the bottom of the trough-shaped centre part of the stringers near the idlers for the lower strand, this strand can be watched and the idlers can, if the lower strand should have shifted, be so adjusted that the belt passes over the idlers in the correct way. This correction of the belt travel can be done in a known way, by placing the idlers at an angle deviating from 90° to the direction of the belt travel.

In a preferred embodiment of the invention the sections of the stringers are linked by strips which are accommodated in the trough-shaped parts facing outwards and are provided with holes which fit with a wide clearance around the fastening elements for the cross ties situated at the ends of the sections. This method of connection makes it possible for the sections of the frame to be placed at an angle to each other in the vertical plane, so that without the application of special fastening elements a hinging connection is obtained which provides for sufficient adaptability to irregularities of the floor.

The invention will be further elucidated with reference to the embodiment shown in the drawing wherein:

FIG. 1 is a cross section of a belt conveyor according to the invention;

FIG. 2 is a side elevation of the conveyor;

FIG. 3 is a section of a stringer drawn to a larger scale; and

FIG. 4 is a side elevation of the connection between two stringers, drawn to a larger scale.

As shown in the drawings, the frame of a belt conveyor, according to the invention, consists of two substantially parallel rows of stringers 1, connected to each other by traverses (i.e., cross ties or cross members) 2 and 3. The stringers are pressed from 3 mm. thick plate and have a W-shaped cross section. This cross section (see FIGURE 3) comprises a trough-shaped centre part 4, the flat bottom 5 of which constitutes the outermost plane of the frame. The edges 6 and 6' of the trough-shaped part are offset from the parallel to the trough bottom, thus forming the flanges 7 and 7', respectively. The edges 8 and 8' of these flanges are bent outwards, normal (perpendicular) to the flanges, so that over and under the trough-shaped centre part 4 there are trough-shaped parts 9 and 9'.

The stringers are symmetrical in section, so that they can be used on either side of the frame when rotated about their longitudinal axis. The trough-shaped part 9, which, in the left-hand stringer shown in FIG. 3, is over the trough-shaped centre part 4, will, in the stringers on the right-hand side of the frame, be situated under the centre part 4. The possibility of using the stringers both on the left-hand and on the right-hand side of the frame by turning them around their longitudinal axis is of great importance, since in a mine gallery it is impossible to turn a stringer around (i.e., about the vertical axis) in such a way that the leading end will become the rear end.

The traverses 2 are fastened to the stringers by means of bolts 10. The nuts 11 are in the trough-shaped part 9, so that there are no parts projecting outside the frame. The heads of the bolts are in a trough-shaped part 12 of the traverse 2, so that they cannot turn together with the nuts when the latter are being tightened. The traverses or crossties 3 are fastened to the stringers by means of bolts 13. The nuts 14 are in the trough-shaped part 9', and the bolt heads are prevented from turning with the nuts in mounting since they lie against the wall of the crosstie 3.

The frame consists of parallel rows of stringers with the stringers in each row divided into sections which are fastened to each other by means of strips 15 and 15'. These strips are likewise situated in the trough-shaped parts 9 and 9', and are fastened to the stringers by the same bolts 10 and 13 as connect the stringers with the traverses 2 and 3. The bolt holes 16 in the strips 15 and 15' are of larger diameter than the bolts, so that the stringer sections have a certain mobility with respect to each other in the vertical plane. The use of the construction here described makes it possible for the conveyor to be mounted or taken apart by a single operator.

The traverses 2 carry brackets 17 and 18 for the idlers 19 and 20. The brackets 17 have three slots 21 in which the side idlers 19 are borne. Normally, the shafts of these idlers rest in the centre slots. However, if the upper strand 22 of the conveyor belt tends to move sideways, the outer idlers are placed at an oblique angle towards the direction of transport by placing the shafts in the outer slots. Thus the tendency of the belt to move sideways is counteracted.

The traverses 3 carry brackets 23 for the idlers 24 for the lower strand 25. Also these brackets are provided with three slots 26, by means of which sideward shifting of the lower strand can be corrected. To render this possible, openings 27 are provided in the walls 5 of the stringers, so that the position of the lower strand can be watched and, if necessary, the rollers 24 can be transposed. Should the lower strand move sideways, this shifting is limited by the wall 5. In this case the contact area between the side of the belt and the continuous wall is rather large, so that the pressure per unit area will be low and excessive wear of or damage to the belt is precluded. On account of this the distance between the walls 5 and the belt may be kept small. If the belt has a width of 1 m., the over-all width of the conveyor is only 1200 mm.

Between the stringers there are cover plates 28, to prevent material getting onto the lower strand. The terminal edges of the sections are reinforced by means of strips 29 and 29' welded into the trough-shaped parts 9 and 9', to prevent damage when the sections are transported.

What is claimed is:

1. Frame for a conveyor belt, consisting of two stringers, upper and lower traverses and upper and lower idler brackets, each stringer comprising a plurality of stringer sections disposed in end-to-end relationship, and means for connecting said stringer sections in end-to-end relationship, said two stringers being connected in parallel relationship by means of the upper and lower traverses which carry, respectively, the upper and lower idler brackets for the upper and lower strands of the conveyor belt, each stringer having central portions that are trough-shaped in cross section, said trough-shaped portion having a flat bottom disposed opposite the lower strand of the conveyor belt, and the side walls, which project inwards, being bent over and under to form trough-shaped parts which are open towards the outside of the frame and in which the fastening elements for the traverses are accommodated.

2. Frame for a conveyor belt according to claim 1, characterized in that the stringers have a symmetrical cross section.

3. Frame according to claim 1 characterized in that the bottom of the central trough-shaped portion is provided with openings at the places where the idlers for the lower strand are situated.

4. Frame according to claim 1, characterized in that the sections of the stringers are linked by strips which are accommodated in the trough-shaped parts facing outwards and are provided with holes which fit with a wide clearance around the fastening elements for the traverses situated at the ends of the sections.

5. A frame for a conveyor belt comprising a pair of longitudinally disposed stringer sections, upper and lower trough-shaped cross members respectively supporting upper and lower idler brackets, and bolt means for connecting said cross members to said stringer sections, each stringer section having a substantially W-shaped configuration in cross section defined by a central inwardly facing trough and an outwardly facing trough disposed above and below the central trough, said stringer sections being connected in parallel relationship by the bolt means and the upper and lower cross members wherein the bolt means are held against rotation through engagement with the surfaces of the trough-shaped cross members, and means at the ends of said stringer sections for connecting each stringer section with successive stringer sections in end-to-end relationship.

6. In combination, a conveyor belt having upper and lower strands and a frame for said conveyor belt, said frame comprising a plurality of longitudinal members disposed in substantially parallel rows with the longitudinal members in each row disposed in substantially abutting end-to-end relationship, strip means and fastening elements to connect said longitudinal members in said abutting relationship, each longitudinal member having a substantially W-shaped configuration in cross section defined by a central inwardly facing trough and an outwardly facing trough disposed above and below the central trough, opposite longitudinal members in each row being connected by upper and lower trough-shaped cross members, the upper cross member supporting idler rolls for the upper strand of the conveyor belt and the lower cross member supporting idler rolls for the lower strand of the conveyor belt, said cross members being connected to said longitudinal members by means of bolts which are held against rotation through engagement with the surfaces of the cross members.

References Cited by the Examiner

UNITED STATES PATENTS 2,688,394    9/1954    Hurd _____ 198—192 X

FOREIGN PATENTS 949,034    9/1956    Germany.

EVON C. BLUNK, *Primary Examiner.*

EDWARD A. SROKA, *Examiner.*